United States Patent
von Bonin et al.

[11] 4,334,992
[45] Jun. 15, 1982

[54] MODULAR BLOCK FOR OSMOTIC METHODS OF SEPARATION

[75] Inventors: Wulf von Bonin, Leverkusen; Jürgen Lahrs; Eberhard Born, both of Cologne, all of Fed. Rep. of Germany

[73] Assignee: Bayer Aktiengesellschaft, Leverkusen, Fed. Rep. of Germany

[21] Appl. No.: 118,333

[22] Filed: Feb. 4, 1980

[30] Foreign Application Priority Data

Feb. 24, 1979 [DE] Fed. Rep. of Germany ...... 2907319

[51] Int. Cl.³ ............................................. B01D 31/00
[52] U.S. Cl. .................................. 210/241; 210/347; 210/433.2; 210/447; 210/456
[58] Field of Search ...................... 210/321.1, 346–347, 210/433.2, 456, 486, 323.1, 652, 447, 237, 241, 321.2–321.5, 328, 329, 453, 541

[56] References Cited
U.S. PATENT DOCUMENTS

| | | | |
|---|---|---|---|
| 3,398,833 | 8/1968 | Marks et al. | 210/541 X |
| 3,398,834 | 8/1968 | Nuttall et al. | 210/433.2 X |
| 3,945,923 | 3/1976 | Rogers et al. | 210/323.2 |
| 4,028,248 | 6/1977 | Muravskas et al. | 210/447 X |
| 4,115,274 | 9/1978 | Boddeker et al. | 210/321.1 |

FOREIGN PATENT DOCUMENTS 984761 3/1976 Canada .............................. 210/321.1

Primary Examiner—Thomas G. Wyse
Assistant Examiner—David R. Sadowski
Attorney, Agent, or Firm—Sprung, Horn, Kramer & Woods

[57] ABSTRACT

A modular block for osmotic methods of separation under pressure can be folded open and the filtration unit can easily be removed and introduced in the process. The filtration unit consists of a base plate with a membrane filter candle, and the filter candle consists of a stack of membrane filter plates. Spacers are placed between the filter plates and deflecting plates are provided to ensure zigzag penetration. The permeate transportation is displaced to the edge of the plates. The permeate issues laterally at the flange.

3 Claims, 9 Drawing Figures

(C-C)

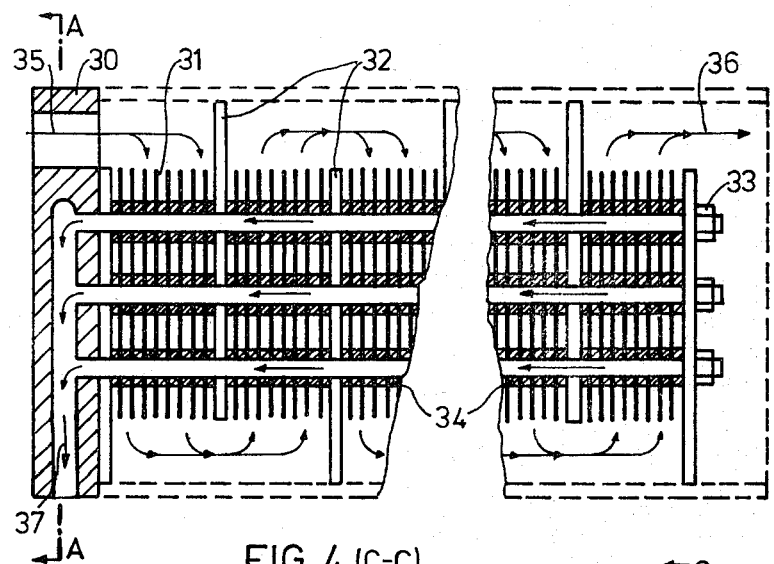
FIG. 4 (C-C)
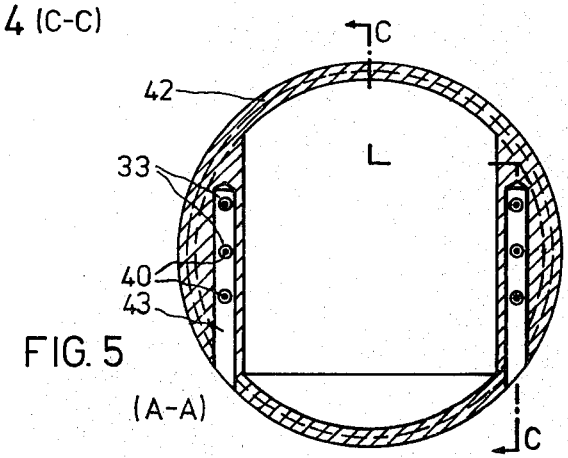
FIG. 5 (A-A)
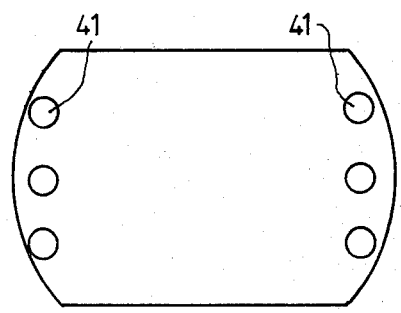
FIG. 6
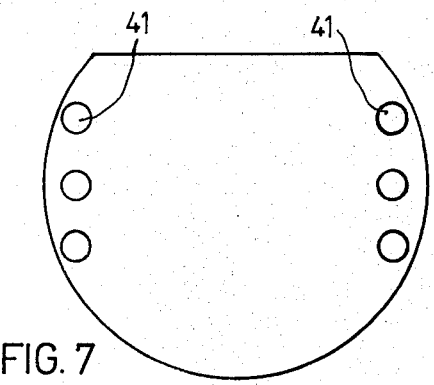
FIG. 7

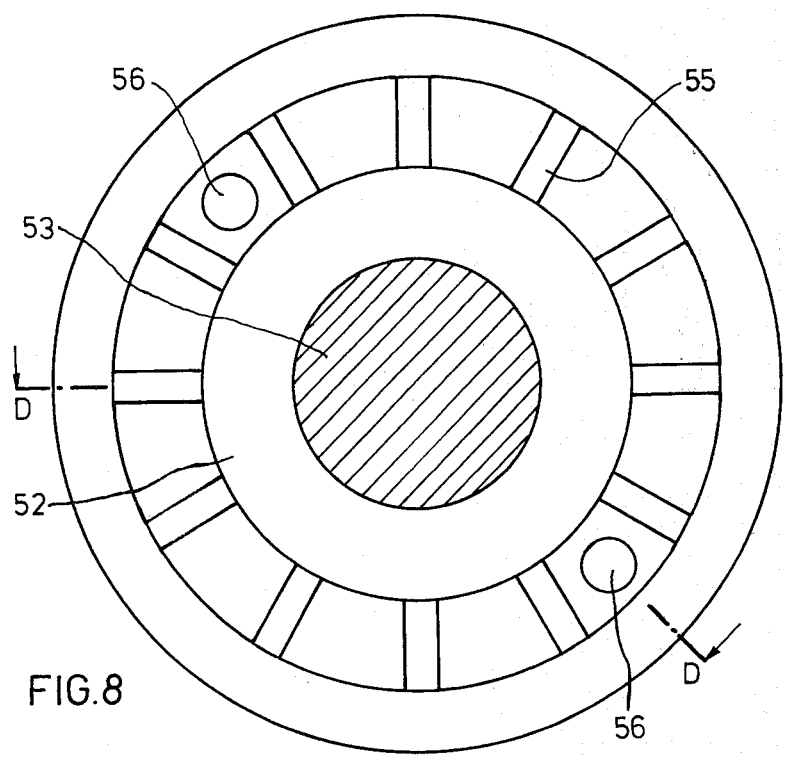
FIG.8
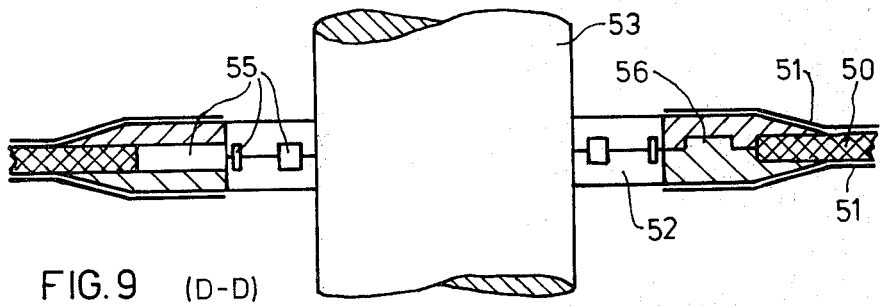
FIG.9 (D-D)

MODULAR BLOCK FOR OSMOTIC METHODS OF SEPARATION

BACKGROUND OF THE INVENTION

The invention relates to a modular block for osmotic methods of separation in which a pressure permeation unit consists of a pressure tube sealed at its end with a filtration unit and the solution is supplied and discharged and the permeate discharged via flanges provided on the covers of the pressure tube. With this apparatus, it is possible to exchange and optionally recycle the filtration unit with very little manipulation.

Now that pressure permeation, i.e. ultra filtration and reverse osmosis are becoming increasingly important, problems of economy are also brought markedly into the foreground. In addition to the expense incurred for power and personnel, the expenses for apparatus are of great importance for carrying out pressure permeation economically. Most flat membrane modules are so complicated in design that they cannot be "throw away modules" but are invariably designed for exchange of membranes. Exchange of membranes of this type, however, is very labour-intensive and therefore associated with high costs. Moreover, the loss of production occurring during the membrane exchange time has to be added to the membrane exchange costs.

A pressure permeation apparatus is generally much simpler for the operator if he can replace the used modules by new modules without high labour costs. However, a mode of operation of this type presupposes that the production of the module is so inexpensive that when it is necessary to exchange the membrane, this can be omitted and the entire module, or rather the filtration unit, can be exchanged for a new one.

Such a module exchange is carried out, for example, in the case of winding modules, hollow fine modules and hollow fibre modules, in which process, however, the entire module, i.e. filtration unit has to be exchanged in addition to the pressure container.

It is not possible to solve all the problems of separation using this type of module. Thus, with the three above-mentioned types, it is only possible to process solid-containing liquid systems to a limited extent. In addition, the operating pressure is restricted to such low pressures in the case of hollow fibre capillaries that reverse osmosis cannot be carried out.

It is advantageous to traverse certain problems of material separation on strong flat membrane modules of the type known, for example, as plate frame modules of various designs.

Known flat membrane modules are, however, very expensive to design or produce. Encapsulations (German Offenlegungsschrift No. 25 42 957, German Auslegeschrift No. 16 42 808) or five-layered modular elements with a permeate absorbing shell (German Offenlegungsschrift No. 24 33 456) or brittle porous support plates of complicated geometry (German Offenlegungsschrift No. 26 03 505), interrupted substrates which can be coated uniformly only with difficulty (German Offenlegungsschrift No. 25 25 972) or elements which can only be connected in tandem and with which sealing problems arise (German Offenelgungsschrift No. 25 56 210) are known.

Modules of this type are usually not designed as single use modules but for exchange of the membrane or element. In order to change the course of flow, for example, during the transition from parallel to series connection, it is often necessary to use additional, separate sealing elements (German Offenlegungsschrift No. 25 42 957, Swiss Pat. No. 542 639) and to fit sealing elements or partition walls.

SUMMARY OF THE INVENTION

An object of the invention is to develop a modular block for osmotic methods of separation with a pressure unit which allows the part which wears i.e. the filtration unit, to be exchanged and optionally recycled with few manipulations. The object is achieved in that the pressure tube is mounted in the modular block in such a way that it can be flipped outwards so as to free an end face in such a way that the renewable filtration unit which contains integral permeate delivery means can be inserted into or removed from the tube, and the filtration unit consists of a base plate and stacks of spaced membrane filter plates, wherein channels are provided in the plates for the delivery of the permeate which together with bored spacers are in communication with connections in the base plate.

In particular, the invention relates to a modular block for osmotic methods of separation in the pressure range up to 180 bar, characterised by the co-operation of various individual structural members consisting of a frame containing at least one module, and the module consists of a pressure tube having end plates arranged on its faces which seal it tight to liquid and to pressure and contain the feed and delivery flange for the solution to be treated, wherein the pressure tube of the module are rotatably mounted on an axis and can be flipped out of the frame so as to completely free at least one face on which a membrane filter candle can be introduced or removed, consisting of a base plate which represents a sealing shut-off between the end plate and pressure tube and contains permeate delivery channels, wherein two opposing rows of screws are arranged on the base plate in the peripheral region thereof, membrane filter plates which are spaced apart by spacers being mounted on the screws, thereby forming a penetratable stack, and up to ten membrane plates represent a penetration unit, a deflecting plate optionally also acting as a membrane plate then follows before the next penetration unit so as to produce a zigzag flow during penetration of the membrane plates have the form of a circle filling out the pressure tube, from which two opposing segments have been cut out, and the deflecting plates have the form of a similar circle from which only one segment is cut out, and the two types of plates have two opposing rows of bores which correspond to the screws in the base plate but are somewhat larger in diameter than the expansion screws with which the entire stack of plates with the spacers is pressed together to form a seal and the permeate is delivered in the direction of the base plate from the interior of the membrane filter plates along the annular channels around the expansion screws, and the membrane filter plate consists of a porous, pressure-resistant supporting layer with optionally supported membranes laying on both sides thereof, and the spacers being inserted in the bores in the supporting plate and covered by the membrane, wherein the annular channel remains free, in which the permeate can flow through channels arranged in the spacer in the central plate plane from the interior of the plate into the annular channels to an outlet channel in the base plate.

An apparatus according to the invention is illustrated in the drawings and described by way of example below.

BRIEF DESCRIPTION OF THE DRAWINGS

FIG. 4 shows a section along line C—C of FIG. 5 through a filtration unit.

FIG. 5 shows a section along line A—A of FIG. 4 through a base plate.

FIG. 6 shows a membrane plate.

FIG. 7 shows a deflecting plate.

FIG. 8 shows a plan view of a spacer.

FIG. 9 shows a detail of the membrane plate and spacer in a side view along D—D of FIG. 8.

DETAILED DESCRIPTION OF THE INVENTION

A module block consists of three structural groups: a frame, one or more pressure permeation units, i.e. pressure tubes with end plates, and a filtration unit for each pressure permeation unit which consists of a base plate with membrane filter candle.

Figure 1:
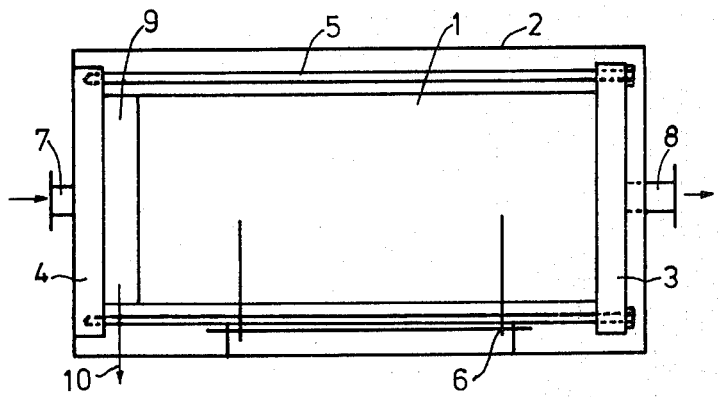
FIG. 1 shows a plan view of a modular block with a pressure permeation unit according to the invention.

In FIG. 1, the modular block comprises a pressure tube 1 which is mounted on a frame 2. End plates 3,4 which seal the pressure tube 1 tight against liquid via tension rods 5, are arranged at the ends of the pressure tube 1. If the tension rods 5 are released, the pressure tube 1 can be flipped up and out. The pressure tube is laterally mounted on the frame 6. The solution flows in via flanges on the end plates at 7 and out at 8. The permeate is passed in the filtration unit to a base plate 9 and flows out from there laterally at 10. One pressure permeation unit has an effective membrane surface area of about 10 m$^2$.

Figure 2:
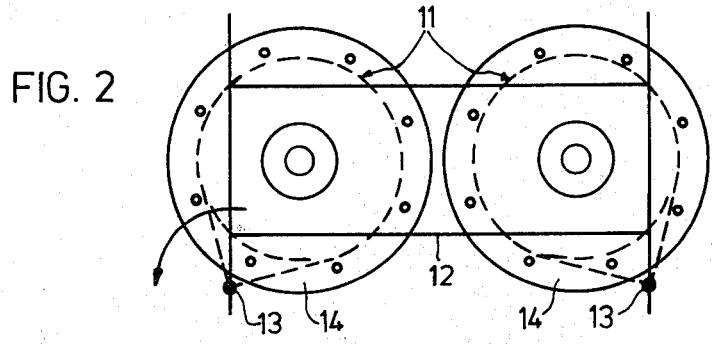
FIG. 2 shows a modular block from the front with two pressure permeation units.

In FIG. 2, a modular block consists of two pressure permeation units 11. They are arranged adjacent to each other on the frame 12 and can be flipped outwards about the bearing 13. The end plates 14 remain in their position. The 20 m$^2$ block shown in FIG. 2 has dimensions of 80×75×50 cm and weighs about 250 kg. The permissible operating pressure goes up to 180 bar and is preferably from 3 to 80 bar.

Figure 3:
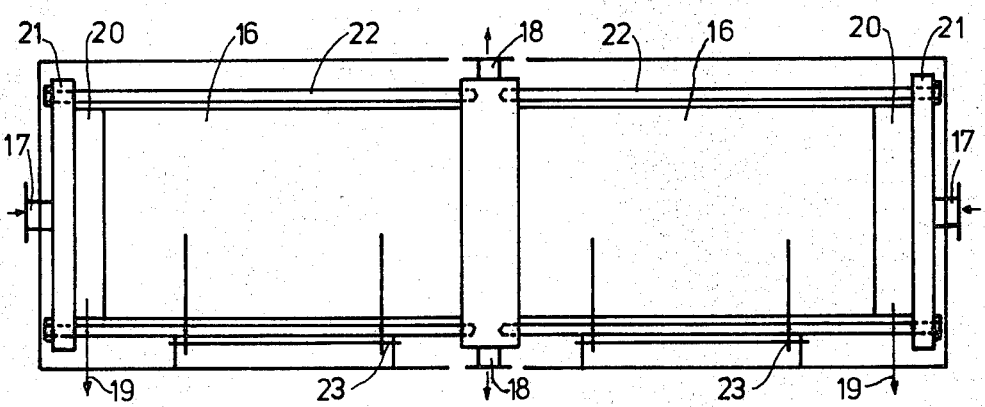
FIG. 3 shows a modular block with a tandem module.

A modular block having a membrane surface area of 20 m$^2$ is illustrated as a tandem module in FIG. 3. Two adjacent pressure tubes 16 are charged from the end 17. The solution is delivered in the middle 18. The permeate is delivered laterally at 19 from the base plate 20 as with the modular block in FIG. 1. The end plates 21 are also pressed together by tension rods 22. The pressure tubes 16 can each be flipped up and out individually by the pivoting apparatus 23. The filtration unit which is suspended from the base plate 20 can be exchanged without difficulty in this position.

FIG. 4 shows a longitudinal section through a filtration unit (membrane filter candle). It consists of a base plate 30 on which the filter candle is made up by membrane plates 31 and deflecting plates 32 which are pressed together by means of expansion screws 33. Spacers 34 are located between each membrane plate or between membrane plate and deflecting plate so that the solution supplied through the base plate at 35 can reach the membranes on the membrane plates 31. The delivery of the solution via the upper end plate of the pressure permeation unit is indicated by 36. Zigzag penetration of the filtration unit is ensured by the deflecting plates 32 fitted as baffle plates. The bores 41 in the membrane plates 31 and deflecting plates 32 through which the expansion screws 33 can be passed are larger in diameter than would be necessary for guiding the expansion screws 33. This provides a space 41a through which the permeate can flow into the base plate 30, from where it issues laterally at 37.

FIG. 5 shows a section through the base plate. The exact position of the section A—A is shown in FIG. 4 in the same manner as the path of the section C—C is shown in FIG. 5. It is observed, in particular, that there is a free space 41a around the expansion screws 40 so that the permeate can flow along the expansion screws into the base plate 42 where it is then collected through the channels 43 and passed outwards. A membrane filter candle weighs about 20 kg. It is a relatively strong unit which can easily be cleaned. Membrane filter candles which have become unserviceable can easily be exchanged for new ones and re-cycled. For transportation purposes, the candle is inserted in a plastic protective tube which is similar to the pressure tube. FIG. 6 shows a membrane plate and FIG. 7 a deflecting plate. The membrane surface area of a plate amounts to about 450 cm$^2$.

The diameter of a membrane filter candle is usually identical with the internal diameter of the pressure tube. In this example, eight membrane plates 31 form a penetration unit. A deflecting plate 32 is then introduced. The deflecting plates are arranged so as to produce a zigzag flow during penetration of the bundle of membrane plates provided. In this example, a modular unit consists of 160 membrane plates. The internal diameter of the tubes is 25 cm. The membrane plates are circular. As shown in FIG. 6, two opposing segments are cut away. Only one segment is cut away from deflecting plates which are otherwise designed like membrane plates. In the peripheral region, the plates have two opposing rows of three bores 41 which correspond to the expansion screws in the base plate, with which the entire stack of membrane plates is pressed together to form a seal.

The membrane plates consist of a porous pressure-resistant supporting plate and the membranes lain on it on both sides. Half of the spacers in FIG. 8 are inserted into the porous supporting plate (FIG. 9) in accordance with the press stud principle. They are covered by the membrane 51 so that the seal is provided by two membranes which are each pressed on to each other in the case of stacking on the annular channels.

FIG. 9 shows the section D—D in FIG. 8. Supporting plate 50, on both sides of which a membrane 51 is lain, provides for a space for the annular channel 52 around the expansion screw 53. The porous supporting plate is preferably produced from synthetic resin bonded glass fibre woven fabrics laminated on both sides, both also consist of porous ceramic material, of sintered metal or sintered plastics such as, for example, of polytetrafluoroethylene.

The membrane preferably consists of a porous support, for example, HD-PE paper with a separating membrane applied to it. The production of this supported membrane is theoretically independent of the membrane polymer and takes place according to the prior art by applying the polymer solution to the support material, drying it briefly and precipitating the membrane in a water bath. Suitable polymers include cellulose esters, for example, acetates, acrylonitrile copolymers, polyamides (in particular aromatic types), polybenzoxazine diones, polyimides, polysulphones, fluoropolymers and others.

The porous supporting plate also serves to stabilise the membrane plate mechanically. It is surrounded by the membrane as if by a film bag. The edges are sealed by bonding and/or optionally by a sealing coating of the edge zone with synthetic resins based, for example, on polyester, polyurethane or polyepoxide. Exposed points are optionally modified with special coatings. The spacer illustrated in FIGS. 8 and 9 takes up the sealing forces of the rivetting or screwing of the stack of plates and also serves to discharge the permeate entering the porous supporting plate through the membrane into the annular channels. It preferably consists of two halves which are pressed into the lateral hole from both sides of the support plate, engage like a press stud 56 and contain on their contacting surface many small channels 55, for example, twelve in this case, which convey the permeate in the interior of the plate to the annular channel 52 between the spacer and expansion screw.

The spacers are preferably injection-moulded plastics members, but can also be produced from metal. Together with the membrane plates, they form the members which are preferably produced from non-metallic materials.

A modular block of the type illustrated in FIG. 2 with a membrane area of about 20 m² has approximately the following power and design data:

| | |
|---|---|
| Throughput | $2 \times 10^3$ m³/h |
| Pressure | 80 bar |
| Pressure drop | about $2 \times 5$ bar |
| Permeate produced (5% Congo red, 40 bar) | about $2 \times 0.4$ m³/h |
| Permeate produced (H₂O, 80 bar) | about $2 \times 0.9$ m³/h |
| Pump output | 60 to 120 kW |
| Dimensions in mm | 785 × 710 × 450 |
| Total weight | 270 kg |
| Specific surface area of pressure tube | 300 m²/m³ |
| Specific surface area of modular block | 70 m²/m³ | mounted therein comprising a base plate having a fluid inlet passage communicating with one end plate fluid inlet and a permeate outlet passage and an outside diameter at least equal to that of the pressure tube, a plurality of spaced apart membrane filter plates which define interior spaces which communicate with said permeate outlet passage supported on the base plate in parallel therewith and configured to be slidably received in the pressure tube with the base plate abutting one of said end plates and one end of the pressure tube; wherein the means mounting the end plates includes means for adjusting the distance therebetween to slidably receive the pressure tube and filter candle base plate therebetween and to press the end plates, base plate and pressure tube together to form a fluid-tight seal therebetween; and means mounting the pressure tube to the frame for pivotal movement, when the end plates permit the sliding movement thereof, about an axis spaced from and parallel to the longitudinal axis of the pressure tube between an operative position wherein the end plates, base plate and tube are aligned to enable sealing and a flipped out position wherein the ends of the pressure tube are accessible to permit the removal and insertion of a filter candle.

2. The modular block according to claim 1, wherein the filter plates have channels therein for the delivery of permeate and spacers therebetween having bores therein to effect fluid communication between the channels and the permeate outlet in the base plate.

3. A modular block for osmotic methods of separation of a permeate from a fluid for a pressure range up to 180 bar, comprising: a frame for at least one module including end plates having respective fluid inlet and outlet openings therein and means mounting the end plates in a spaced apart and parallel condition; wherein each module comprises a pressure tube and a membrane filter candle removably mounted therein and comprising a base plate having a fluid inlet passage communicating with one end plate fluid inlet and a permeate outlet passage and an outside diameter at least equal to that of the pressure tube, two opposing rows of screws arranged in the peripheral region on the base plate, membrane filter plates which are spaced from each other by spacers mounted on the screws to form a penetratable stack with up to ten membrane plates forming a penetration unit, a deflecting plate acting as a membrane plate disposed between penetration units so as to produce a zigzag flow during penetration of the membrane filter candle, and wherein the membrane plates have the form of a disk configured to be slidably re-

| | Structural group data | | | | | | | | | | | |
|---|---|---|---|---|---|---|---|---|---|---|---|---|
| | 1 Frame | | | | 2 pressure tube with end plates | | | | 3 Base plate with membrane filter candle | | | |
| | | | | | End plate with | | | | | | | |
| | Frame | Holding claws | Bearing block | Axis | Pressure tube | support tube | Tension rod | Base plate | Expansion screw | Support plate | Membrane | Deflecting plate | Spacer |
| Material | St37 | St37 | St37 | C110 | St 35,8 | C22 | 24CrMo | C22 | 24CrMo | — | — | Plastic | Plastic |
| Length mm | 785 | 150 | — | 420 | 605 | | 780 | | 635 | | | | |
| Width mm | 710 | 150 | — | φ16 | φ273 | φ350 | M24 | φ273 | M12 | φ252 | φ252 | φ252 | φ24 |
| Height mm | 450 | 10 | — | — | — | 38 | | 50 | 1 | | 3 | 1,75 | |
| Weight kg | 24 | 1 | — | 0.7 | 39.5 | 28 | 2,3 | 6.5 | 0.3 | 0.06 | — | 0.165 | — |
| Number of items | 1 | 4 | 4 | 2 | 2 | 4 | 16 | 2 | 12 | 320 | 640 | 42 | 1920 |

What is claimed is:

1. A modular block for osmotic methods of separation of a permeate from a fluid, comprising: a frame including end plates having respective fluid inlet and outlet openings therein and means mounting the end plates in a spaced apart and parallel condition; a pressure tube having a membrane filter candle removably ceived in the pressure tube with the base plate abutting one of said end plates and one end of the tube and of which two opposing segments are cut away, and the membrane and deflecting plates have two opposing rows of bores which correspond to the screws in the base plate to form annular channels between said bores and said screws and with which the entire stack of plates in addition to the spacers is pressed together to seal the channels and the permeate is delivered in the direction of the base plate from the interior of the membrane filter plates along the annular channels around the screws and into said permeate outlet passage, and the membrane filter plates each consist of a porous pressure-resistant supporting layer having bores therein and supporting membranes placed on both sides of the supporting layer and wherein the spacers are inserted into the bore of the supporting layer and covered by the membrane, wherein the annular channels in which the permeate can flow further comprise channels arranged in the spacer in the plane of the supporting layer and from outside of the layer into the annular channels; wherein the means mounting the end plates includes means for adjusting the distance therebetween to slidably receive the pressure tube and filter candle base plate therebetween and to press the end plates, base plate and pressure tube together to form a fluid-tight seal therebetween; and means mounting the pressure tube to the frame for pivotal movement, when the end plates permit the sliding movement thereof, about an axis spaced from and parallel to the longitudinal axis of the pressure tube between an operative position wherein the end plates, base plate and tube are aligned to enable sealing and a flipped out position wherein the ends of the pressure tube are accessible to permit the removal and insertion of a filter candle.

* * * * *